(12) United States Patent
Smith (10) Patent No.: US 6,348,912 B1
(45) Date of Patent: Feb. 19, 2002

(54) FAMILY MOUSE

(75) Inventor: Dwayne Smith, Nampa, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/317,840

(22) Filed: May 25, 1999

(51) Int. Cl.[7] .................................................. G09G 5/08
(52) U.S. Cl. ........................ 345/163; 345/158; 345/161
(58) Field of Search .............................. 345/156, 157, 345/158, 161–163

(56) References Cited

U.S. PATENT DOCUMENTS

| | | | | |
|---|---|---|---|---|
| 6,072,471 A | * | 6/2000 | Lo | 345/163 |
| 6,084,575 A | * | 7/2000 | Okay | 345/167 |
| 6,088,021 A | * | 7/2000 | Yong | 345/163 |
| 6,097,371 A | * | 8/2000 | Siddiqui et al. | 345/164 |
| 6,198,473 B1 | * | 3/2001 | Armstrong | 345/163 |

* cited by examiner

*Primary Examiner*—Richard Hjerpe
*Assistant Examiner*—Kimnhung Nguyen
(74) *Attorney, Agent, or Firm*—Perkins Coie LLP (57) ABSTRACT

A communication devise for a computer is disclosed. The device is a mouse including conventional operational buttons and supplemental buttons which function similarly to the conventional buttons. The supplemental buttons are positioned adjacent to and behind the conventional buttons, and are useful for operators having small hands, such as children. The supplemental buttons may be recessed as compared to the conventional buttons. Alternatively, a software program in the computer or electrical or mechanical switches may lock out one or more buttons which are not intended for use by the operator.

41 Claims, 4 Drawing Sheets

FAMILY MOUSE

FIELD OF THE INVENTION

The present invention relates to a communication device used with a computer. More particularly, the present invention relates to a mouse adapted for use by operators with different sized hands.

BACKGROUND OF THE INVENTION

Computer mice are well known. Generally, computer mice are manufactured in a single size having standardized dimensions. This size of mouse is suitable for most, but not all, operators. Some computer operators, such as, for example, children or people slight of stature, may have difficulty in operating a standard size mouse. Specifically, smaller people may not have sufficient finger extension to be able to operate a standard sized mouse comfortably. Instead of being able to cup the bulk of the mouse in the palm of their hands while manipulating the operating buttons with their fingers, smaller people may not be able to cup the mouse but instead may rest the heel of their palm on the top of the mouse while trying to manipulate the operating buttons.

SUMMARY OF THE INVENTION

The present invention provides a computer mouse having a body with an upper surface extending between a pair of ends, a first pair of operating buttons positioned on the upper surface adjacent one of the ends, and a second pair of operating buttons positioned on the upper surface toward the other end from the first pair of buttons. The second pair of buttons operate similarly to said first pair of buttons.

The present invention also provides a system for communicating with a computer. The system comprises a mouse having a body with an upper surface extending between a pair of ends and a computer for receiving signals from the mouse. The mouse includes a first pair of operating buttons positioned on the upper surface at one end, and a second pair of operating buttons positioned on the upper surface toward the other end from the first pair of buttons.

DETAILED DESCRIPTION OF PREFERRED EMBODIMENTS

Figure 1:
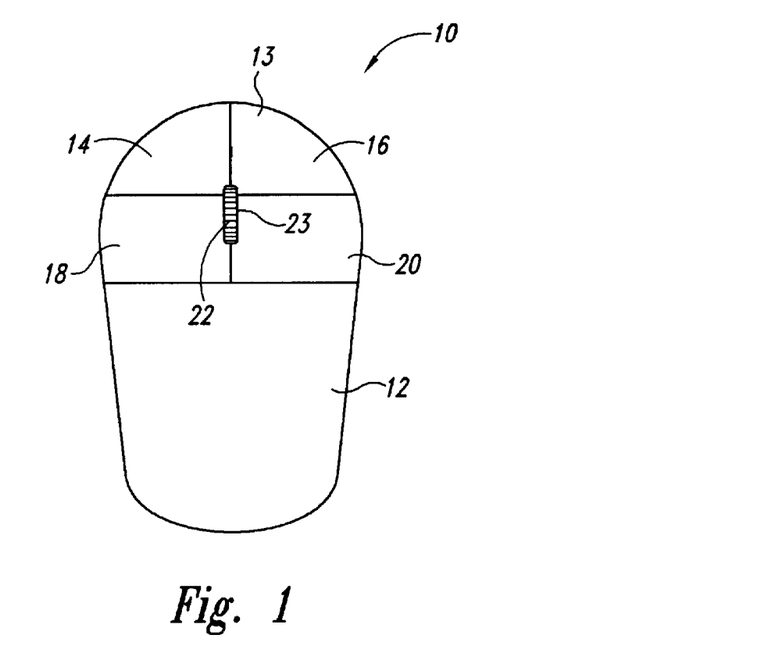
FIG. 1 is a view from the top of a computer mouse constructed in accordance with an embodiment of the present invention.
Figure 2:
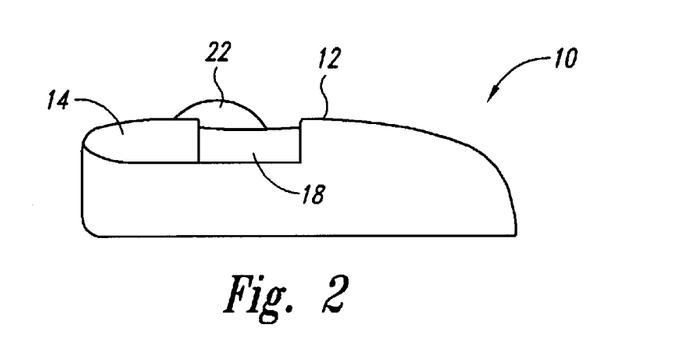
FIG. 2 is a view from the side of the mouse of FIG. 1.

With reference to FIGS. 1–2, there is shown a computer mouse 10 having an upper surface 12. The mouse 10 includes a conventional mouse ball in its underside (not shown) which enables the usual mouse movements. A pair of operational buttons 14, 16 are provided at an end 13 of the mouse 10. Provided adjacent to and behind the buttons 14, 16 are a pair of supplemental buttons 18, 20. The supplemental buttons 18, 20 are provided to allow ease of use of the mouse 10 by operators having small hands, such as children or people of slight stature.

A scroll wheel 22 having a plurality of ridges 23 on its outer circumference is further provided amid the buttons 14, 16, 18, 20 to enable an operator to scroll a computer screen without using the buttons 14, 16, 18, 20.

The left buttons 14, 18 duplicate functions. In other words, the left supplemental button 18 functions similarly to the left operational button 14. Likewise the right supplemental button 20 functions similarly to the right operational button 16. In essence, the operating buttons 14, 18 are placed in electrical parallel arrangement and the operating buttons 16, 20 are also placed in electrical parallel arrangement. Thus, for example, an operator of the mouse 10 could depress or "click on," the left operational button 14 or the left supplemental button 18 with no change in function. Further, the signals generated by the mouse 10 of the invention (including from the mouse ball and from the buttons 14, 16, 18, 20) for controlling a computer are the same as in a conventional mouse.

With reference to FIG. 2, the height of the left supplemental button 18 is lower than the height of the left operational button 14. Further, the right supplemental button 20 is lower than the right operational button 16. The combination of the lowered heights of the buttons 18, 20 with the natural curvature of a person's hand and fingers will lessen the possibility of an operator erroneously clicking on, for example, the right operational button 16 and the right supplemental button 20 at the same time.

Figure 3:
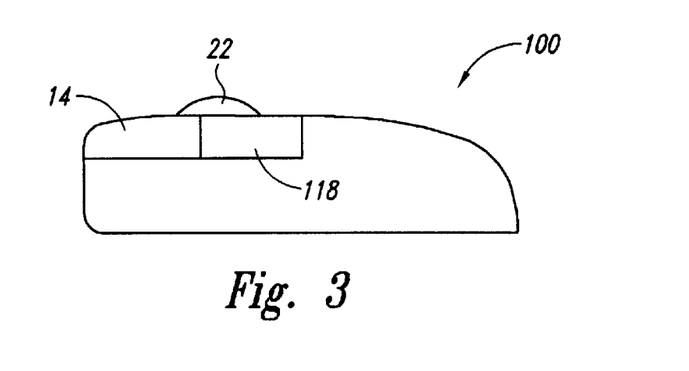
FIG. 3 is a view from the side of a computer mouse constructed in accordance with another embodiment of the present invention.
Figure 4:
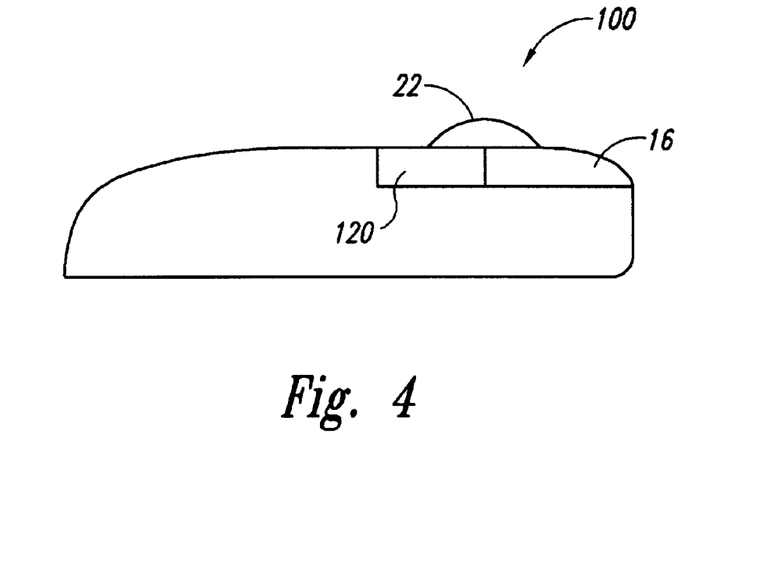
FIG. 4 is another view from the side of the mouse of FIG. 3.

With reference to FIGS. 3–4, a mouse 100 is shown. The mouse 100 differs from the mouse 10 in that a left supplemental button 118 is at the same height as the left operational button 14. Further, the right supplemental button 120 is the same height as the other buttons 14, 16, 118. In this embodiment, the curvature of the operator's hand and fingers act to diminish erroneous clicking of the buttons.

Figure 6:
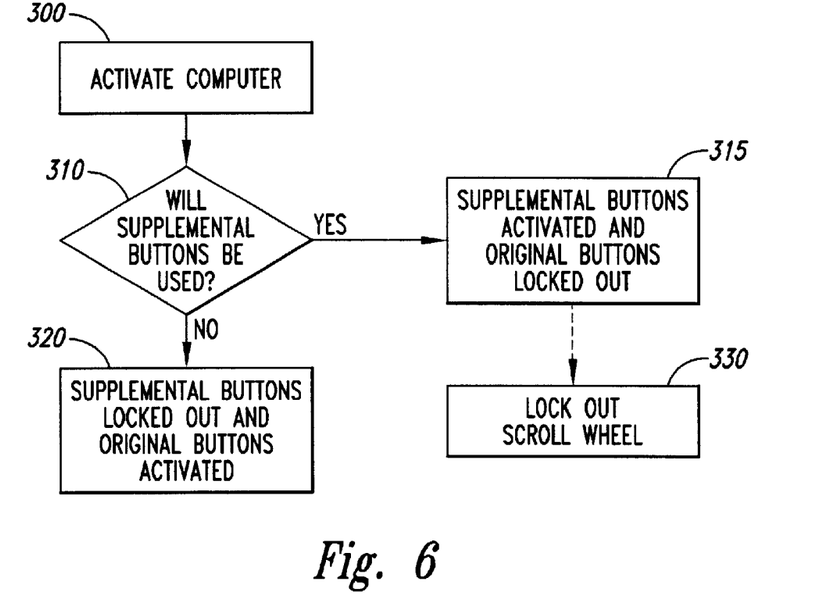
FIG. 6 is a flow diagram of a program used in conjunction with the mouse of FIG. 3.

Additionally, a software program may be included in a computer to which the mouse 100 is connected to assist in lessening erroneous clicking on the buttons. The software program may be part of the mouse driver software typically supplied with a computer mouse. A flow diagram of such a program is shown in FIG. 6. After activating the computer at a program segment 300, the computer queries the operator at a program segment 310 whether the supplemental buttons 118, 120 will be used. If the operator responds that the supplemental buttons 118, 120 will not be used, the supplemental buttons 118, 120 are locked out at a program segment 320 and the original operational buttons 14, 16 are activated. In this mode, the mouse 100 functions as a conventional mouse. If, on the other hand, the operator responds that the supplemental buttons 118, 120 will be used, the supplemental buttons 118, 120 are activated and the original buttons 14, 16 are locked out at a program segment 315.

By locking out the buttons 118, 120 at the program segment 320, the possibility of erroneously clicking a supplemental button 118, 120 is eliminated. By locking out the buttons 14, 16 at the program segment 315, confusion as to which buttons should be used by the operator, such as, for example, a child is reduced. Thus, erroneous clicking is likewise eliminated.

An optional program segment 330 may also be carried out by the program. After locking out the original buttons 14, 16 at the program segment 315, the scroll wheel 22 may also be locked out at a program segment 330. Thus, any confusion surrounding the use of the scroll wheel 22 is eliminated.

Figure 8:
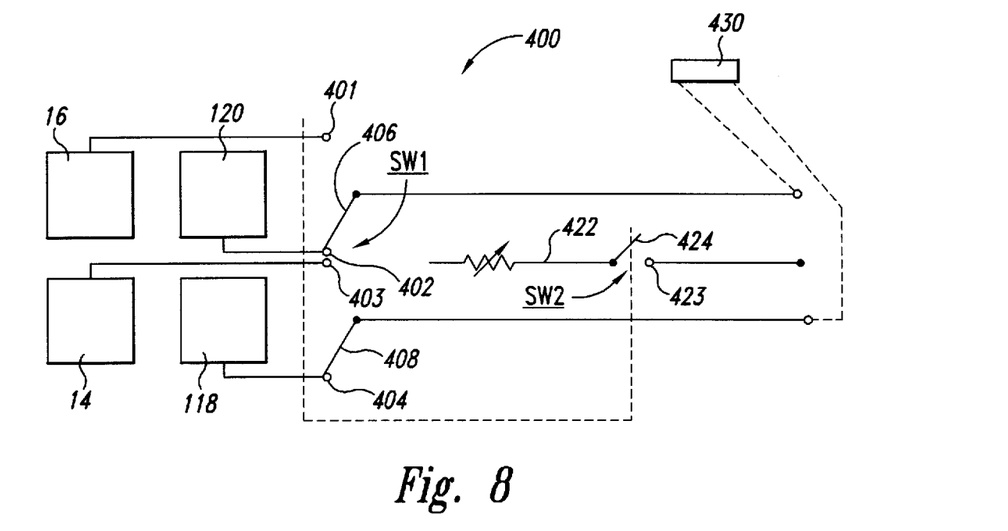
FIG. 8 is a circuit diagram of the mouse of FIG. 3 constructed in accordance with another embodiment of the present invention.

One of the pairs of buttons 14, 16, 118, 120 may be locked out by another method. Specifically, the buttons may be locked out through an electrical switch or through a mechanical device. Referencing FIG. 8, an electrical lockout circuit 400 is shown. The circuit 400 includes a fixed contact 401 off of the button 16, a fixed contact 402 off of the button 120, a fixed contact 403 off of the button 14, and a fixed contact 404 off of the button 118. A switch SW1 includes a pair of movable contacts 406, 408. Specifically, the contact 406 is movable between the fixed contacts 401 and 402, while the contact 408 is movable between the fixed contacts 403 and 404. The switch SW1 is in electrical contact with an exteriorly located switch button 430, shown schematically in FIG. 8. When the switch button 430 is moved into a first position, the movable contact 406 swings into contact with the fixed contact 401 and the movable contact 408 swings into contact with the fixed contact 403, thereby enabling activation of, respectively, the buttons 16 and 14 and the deactivation of, respectively, the supplemental buttons 120 and 118. When the switch button 430 is moved into a second position (as illustrated in FIG. 8), the movable contact 406 swings into contact with the fixed contact 402 and the movable contact 408 swings into contact with the fixed contact 404, thereby enabling activation of, respectively, the supplemental buttons 120 and 118 and the deactivation of, respectively, the buttons 16 and 14.

A scroll wheel circuit 422 may be optionally included in this embodiment. The circuit 422 includes a second switch SW2 having a fixed contact 423 and a movable contact 424. The circuit 422 may be tied into the circuit 400 such that when the supplemental buttons 118, 120 are activated and the buttons 14, 16 are deactivated, the movable contact 424 swings out of contact with the fixed contact 423, thereby disabling the scroll wheel 22. When the buttons 14, 16 are activated and the supplemental buttons 118, 120 are deactivated, the movable contact 424 swings into contact with the fixed contact 423, thereby enabling the scroll wheel 22.

Figure 9:
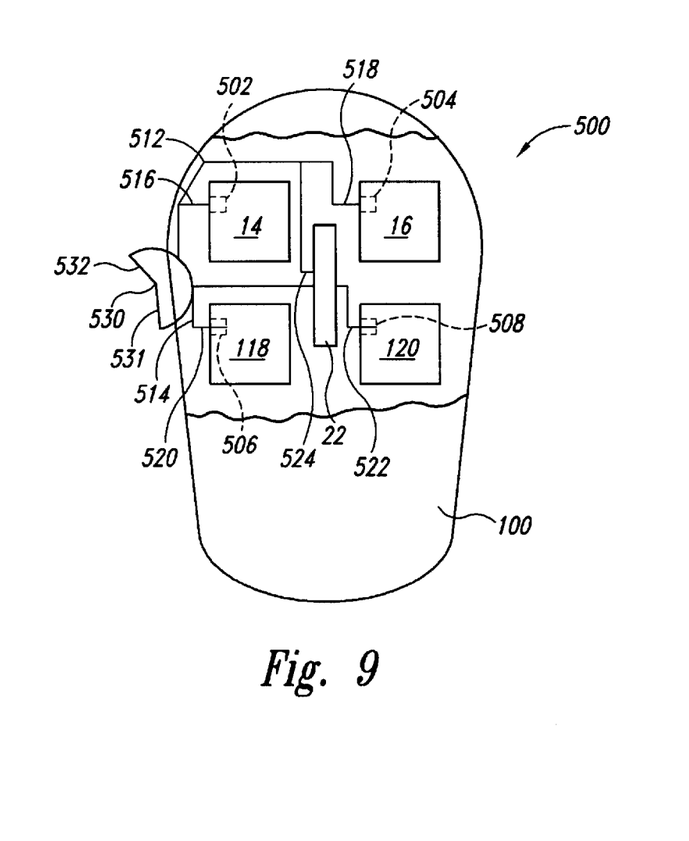
FIG. 9 is a view from the top of a mechanical lockout device of the mouse of FIG. 3 constructed in accordance with another embodiment of the present invention.

FIG. 9 schematically shows a mechanical lockout device 500. Mouse 100 may be designed such that each of the buttons 14, 16, 118, 120 has an opening, respectively, 502, 504, 506, 508. Further, a pair of rods 512 and 514 may be located in movable contact with the openings 502, 504, 506, 508, and with the scroll wheel ridges 23. Specifically, rod 512 includes a pin 516 in movable contact with the opening 502, a pin 518 in movable contact with the opening 504, and a pin 534 in movable contact with the ridges 23. The rod 514 has a pin 520 in movable contact with the opening 506 and a pin 522 in movable contact with the opening 508. The rods 512 and 514 are connected to a switch button 530 having a first side 531 and a second side 532. In operation, when the side 531 is depressed (as illustrated), the pins 520 and 522 enter respectively, the openings 506 and 508, thereby disabling the buttons 118 and 120. When the side 532 is depressed, the pins 520 and 522 exit the openings 506 and 508. Further, the pins 516 and 518 enter, respectively, the openings 502 and 504, thereby disabling the buttons 14, 16. Also, the pin 524 slides between a pair of ridges 23, thereby locking the scroll wheel 22. Alternatively, instead of ridges 23, the scroll wheel 22 may include a plurality of openings to allow locking of the scroll wheel 22 by the pin 524 entering one of the openings.

Although the FIG. 6 program, the FIG. 8 electrical circuit and the FIG. 9 device have been described with reference to the mouse 100, it may also be used to lock out the buttons 14, 16, 18, 20 of the mouse 10 shown in FIGS. 1–2.

Figure 7:
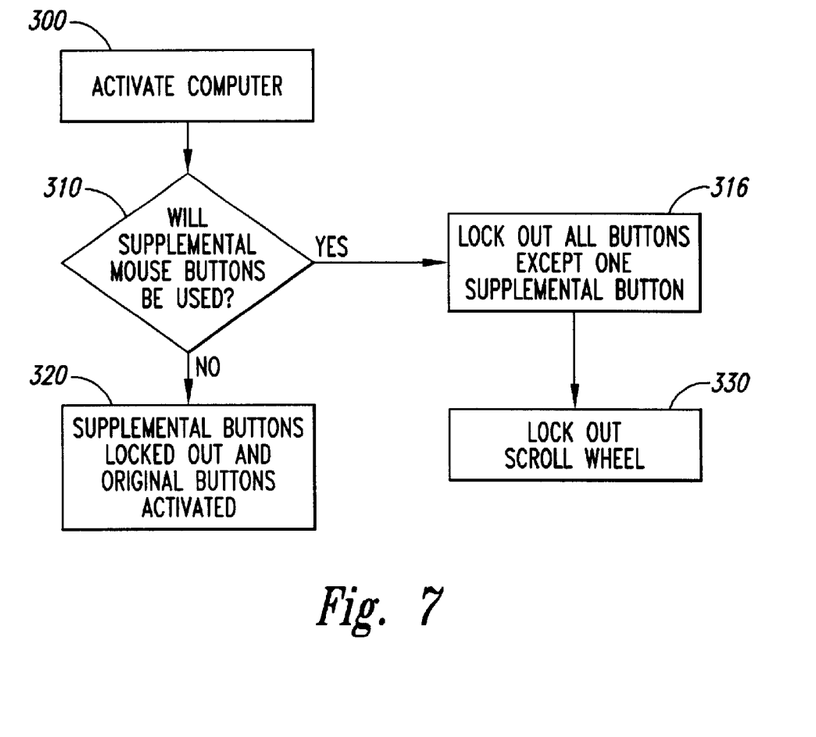
FIG. 7 is a flow diagram of another program used in conjunction with the mouse of FIG. 3.

With reference to FIG. 7, the program segments of an alternative software program will now be described. As with FIG. 6, the computer is activated by the program segment 300, the computer asks at the program segment 310 whether the supplemental buttons 118, 120 will be used, and the supplemental buttons 118, 120 are locked out at the program segment 320 in response to an operator's negative response to the program segment 310 question. If, however, the operator responds that the supplemental buttons 118, 120 will be used, both the original buttons 14, 16 and one of the supplemental buttons 118, 120 are locked out at a program segment 316, thus rendering the mouse 100 into a single operational button communication device.

Figure 5:
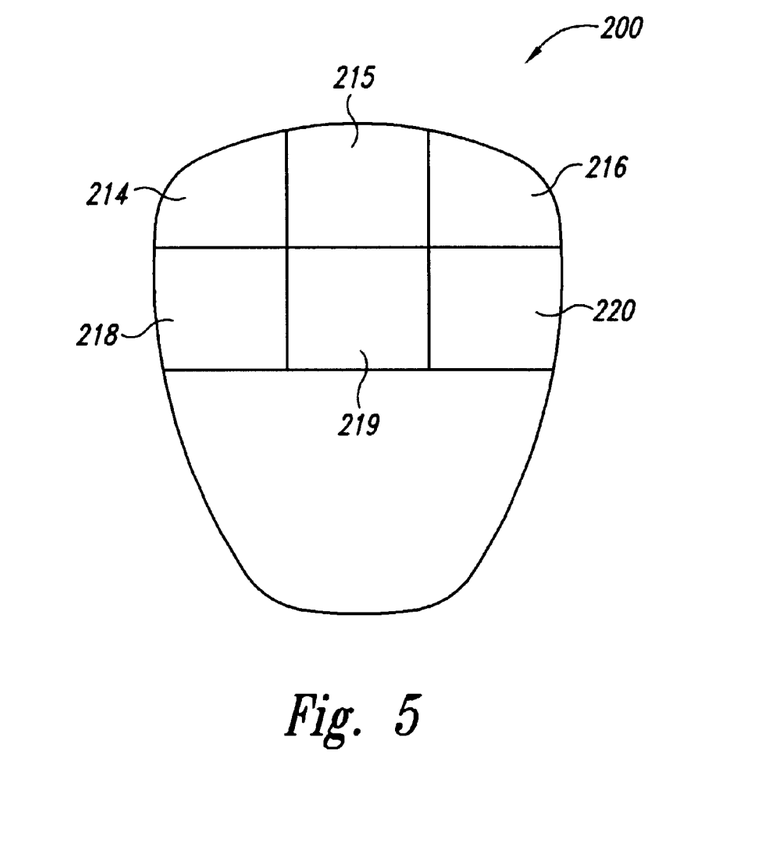
FIG. 5 is a view from the top of a computer mouse constructed in accordance with another embodiment of the present invention.

Although the present invention has been described with reference to a mouse having two sets of two operational buttons, the invention can also be employed with a mouse having two sets of three operational buttons as shown in FIG. 5. FIG. 5 illustrates a mouse 200 with a first set of operational buttons 214, 215, 216 and a supplemental set of operational buttons 218, 219, 220. Although not shown, the scroll wheel 22 may be included in this embodiment as well.

While the invention has been described in detail in connection with specific embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Accordingly, the invention is not to be seen as limited by the foregoing description, but is only limited by the scope of the appended claims.

What is claimed as new and desired to be protected by Letters Patent of the United States is:

1. A computer input device for use by first and second users, the first user having first fingers of a first length, the second user having corresponding second fingers of a second length, the second length being less than the first length, the input device comprising:

a body having an upward facing surface with a first end and a second end, the upward facing surface further having a palm supporting portion toward the first end configured to support a first palm of the first user and a second palm of the second user;

a first pair of input buttons positioned toward the second end of the upward facing surface, the first pair of input buttons being accessible from the upward facing surface to transmit input signals to a computer when actuated, the first pair of input buttons being positioned a first distance away from the palm supporting portion to receive the first fingers of the first user; and     a second pair of input buttons positioned between the first pair of input buttons and the palm supporting portion of the upward facing surface, the second pair of input buttons being accessible from the upward facing surface to transmit input signals to a computer when actuated, the second pair of input buttons being positioned a second distance less than the first distance from the palm supporting surface to receive the second fingers of the second user.

2. The input device of claim 1, wherein the second pair of buttons are recessed from the upward facing surface relative to the first pair of buttons.

3. The input device of claim 1, further comprising a scroll wheel positioned between the first and second pair of buttons.

4. The input device of claim 1, further comprising a fifth input button accessible from the upward facing surface next to the first pair of buttons; and a sixth input button accessible from the upward facing surface next to the second pair of buttons, the fifth and sixth buttons each providing an additional operating command for a computer when actuated.

5. The input device of claim 1, further comprising an electrical lockout switch for selectively locking out one of the first pair of input buttons and the second pair of input buttons.

6. The input device of claim 3, further comprising an electrical lockout switch for selectively locking out the scroll wheel.

7. The input device of claim 6, wherein the electrical lockout switch selectively locks out one of the first pair of input buttons and the second pair of input buttons.

8. The input device of claim 7, wherein the scroll wheel is locked out when the first pair of input buttons is locked out.

9. The input device of claim 1, further comprising a mechanical lockout switch for selectively locking out one of the first pair of input buttons and the second pair of input buttons.

10. The input device of claim 9, further comprising a scroll wheel positioned between the first and second pair of buttons, and a mechanical lockout switch for selectively locking out the scroll wheel.

11. The input device of claim 10, wherein each of the input buttons has an opening and the mechanical lockout switch includes:

a first rod coupled to a first pin and a second pin such that movement of the first rod causes movement of the first and second pins;

a second rod coupled to a third pin and a fourth pin such that movement of the second rod causes movement of the third and fourth pins; and a switch button having a first side and connected to the first rod and a second side connected to the second rod; and wherein when the first side of the switch button is depressed, the first rod moves and the first and second pins move into the openings of, respectively, the first pair of input buttons, thereby locking out the first pair of input buttons, and when the second side of the switch button is depressed, the first rod moves and the first and second pins move out of the openings of, respectively, the first pair of input buttons and the second rod moves and the third and fourth pins move into the openings of the second pair of input buttons, thereby locking out the second pair of input buttons.

12. The input device of claim 11, wherein the scroll wheel has at least one opening, further comprising a fifth pin coupled to the first rod, wherein when the first side of the switch button is depressed, the first rod moves and the fifth pin moves into the opening of the scroll wheel, thereby locking out the scroll wheel, and when the second side of the switch button is depressed, the first rod moves and the fifth pin moves out of the opening of the scroll wheel.

13. The input device of claim 11, wherein the scroll wheel has a plurality of ridges, further comprising a fifth pin coupled to the first rod, wherein when the first side of the switch button is depressed, the first rod moves and the fifth pin moves in between two ridges of the scroll wheel, thereby locking out the scroll wheel, and when the second side of the switch button is depressed, the first rod moves and the fifth pin moves out from in between the two ridges of the scroll wheel.

14. A computer system for use by first and second users, the first user having first fingers of a first length, the second user having corresponding second fingers of a second length, the second length being less than the first length, the system comprising:

an input device having a body with an upward facing surface with a first end and a second end, the upward facing surface further having a palm supporting portion toward the first end configured to support a first palm of the first user and a second palm of the second user;

a first pair of input buttons positioned toward the second end of the upward facing surface, the first pair of input buttons being accessible from the upward facing surface to transmit input signals to a computer when actuated, the first pair of input buttons being positioned a first distance away from the palm supporting portion to receive the first fingers of the first user;

a second pair of input buttons positioned between the first pair of input buttons and the palm supporting portion of the upward facing surface, the second pair of input buttons being accessible from the upward facing surface to transmit input signals to a computer when actuated, the second pair of input buttons being positioned a second distance less than the first distance from the palm supporting surface to receive the second fingers of the second user; and a computer configured to receive signals from the input device.

15. The system of claim 14, wherein the second pair of buttons are recessed from the upward facing surface relative to the first pair of buttons.

16. The system of claim 14, further comprising a scroll wheel positioned between the first and second pair of buttons.

17. The system of claim 14, further comprising a fifth input button accessible from the upward facing surface next to the first pair of buttons; and a sixth input button accessible from the upward facing surface next to the second pair of buttons, the fifth and sixth buttons each providing an additional operating command for the computer when actuated.

18. The system of claim 14, further comprising a mechanism for selectively locking out one of the pairs of input buttons.

19. The system of claim 18, wherein the locking out mechanism includes a software program running on the computer.

20. The system of claim 19, wherein the software program is capable of locking out the first pair of buttons.

21. The system of claim 20, wherein the software program is further capable of locking out one of the second pair of buttons.

22. The system of claim 14, further comprising a scroll wheel positioned between the first and second pair of buttons.

23. The system of claim 22, further comprising a scroll wheel locking out mechanism.

24. The system of claim 23, wherein the scroll wheel locking out mechanism includes a software program running on the computer.

25. The system of claim 18, wherein the mechanism for selectively locking out one of the pairs of operating buttons includes an electrical lockout switch for selectively locking out the first pair of input buttons and the second pair of input buttons.

26. The system of claim 25, further comprising a scroll wheel positioned between the first and second pair of buttons.

27. The system of claim 26, further comprising an electrical lockout switch for selectively locking out the scroll wheel.

28. The system of claim 27, wherein the scroll wheel is locked out when the first pair of input buttons is locked out.

29. The system of claim 14, wherein the mechanism for selectively locking out one of the pairs of input buttons includes a mechanical lockout switch for selectively locking out the first pair of input buttons and the second pair of input buttons.

30. The system of claim 29, wherein each of the input buttons has an opening and the mechanical lockout switch includes:
- a first rod coupled to a first pin and a second pin such that movement of the first rod causes movement of the first and second pins;
- a second rod coupled to a third pin and a fourth pin such that movement of the second rod causes movement of the third and fourth pins; and
- a switch button having a first side and connected to the first rod and a second side connected to the second rod; and
- wherein when the first side of the switch button is depressed, the first rod moves and the first and second pins move into the openings of, respectively, the first pair of input buttons, thereby locking out the first pair of input buttons, and when the second side of the switch button is depressed, the first rod moves and the first and second pins move out of the openings of, respectively, the first pair of input buttons and the second rod moves and the third and fourth pins move into the openings of the second pair of input buttons, thereby locking out the second pair of input buttons.

31. The system of claim 30, further comprising a scroll wheel positioned between the first and second pair of buttons.

32. The system of claim 31, further comprising a mechanical lockout switch for selectively locking out the scroll wheel.

33. The system of claim 32, wherein the scroll wheel has at least one opening, further comprising a fifth pin coupled to the first rod, wherein when the first side of the switch button is depressed, the first rod moves and the fifth pin moves into the opening of the scroll wheel, thereby locking out the scroll wheel, and when the second side of the switch button is depressed, the first rod moves and the fifth pin moves out of the opening of the scroll wheel.

34. The system of claim 33, wherein the scroll wheel has a plurality of ridges, further comprising a fifth pin coupled to the first rod, wherein when the first side of the switch button is depressed, the first rod moves and the fifth pin moves in between two the ridges of the scroll wheel, thereby locking out the scroll wheel, and when the second side of the switch button is depressed, the first rod moves and the fifth pin moves out from in between the two ridges of the scroll wheel.

35. A method for operating a computer input device by first and second users, comprising:
- contacting a palm of the first user with a palm supporting surface of the input device;
- transmitting input signals from the input device to a computer by contacting first input buttons positioned a first distance from the palm supporting surface with first fingers of the first user and activating the first input buttons, the first fingers having a first length; and
- transmitting input signals from the input device to the computer by contacting second input buttons positioned a second distance from the palm supporting surface with corresponding second fingers of the second user and activating the second input buttons, the second fingers having a second length less than the first length and the second distance being less than the first distance.

36. The method of claim 35, further comprising locking out one of the pairs of input buttons.

37. The method of claim 36, wherein locking out includes electrically locking out one of the pairs of input buttons.

38. The method of claim 36, wherein locking out includes mechanically locking out the one pair of input buttons.

39. The method of claim 36, wherein locking out is accomplished through a software program in the computer.

40. A computer mouse comprising:
- a body having an upper surface extending between a pair of ends;
- a first pair of operating buttons positioned on said upper surface adjacent one said end for providing respective operating commands for a computer when actuated;
- a second pair of operating buttons positioned on said upper surface toward the other said end from said first pair of buttons, said second pair of buttons also providing said respective operating commands for a computer when actuated;
- a mechanical lockout switch for selectively locking out one of the said first pair of operating buttons and said second pair of operating buttons;
- a scroll wheel positioned between said first and second pairs of buttons, and a mechanical lockout switch selectively locking out said scroll wheel;
- wherein each of said operating buttons comprises an opening and said mechanical lockout switch comprises:
- a first rod coupled to a first pin and a second pin such that movement of said first rod causes movement of said first and second pins;
- a second rod coupled to a third pin and a fourth pin such that movement of said second rod causes movement of said third and fourth pins; and
- a switch button having a first side and connected to said first rod and a second side connected to said second rod; and
- wherein when said first side of said switch button is depressed, said first rod moves and said first and second pins move into the openings of, respectively, said first pair of operating buttons, thereby locking out said first pair of operating buttons, and when said second side of said switch button is depressed, said first rod moves and said first and second pins move out of the openings of, respectively, said first pair of operating buttons and said second rod moves and said third and fourth pins move into the openings of said second pair of operating buttons, thereby locking out said second pair of operating buttons.

41. A computer mouse comprising:
- a body having an upper surface extending between a pair of ends;
- a first pair of operating buttons positioned on said upper surface adjacent one said end for providing respective operating commands for a computer when actuated;

a second pair of operating buttons positioned on said upper surface toward the other said end from said first pair of buttons, said second pair of buttons also providing said respective operating commands for a computer when actuated;

a mechanical lockout switch for selectively locking out one of the said first pair of operating buttons and said second pair of operating buttons;

a scroll wheel positioned between said first and second pairs of buttons, with said mechanical lockout switch selectively locking out said scroll wheel;

wherein each of said operating buttons comprises an opening and said mechanical lockout switch comprises:

a first rod coupled to a first pin and a second pin such that movement of said first rod causes movement of said first and second pins;

a second rod coupled to a third pin and a fourth pin such that movement of said second rod causes movement of said third and fourth pins; and a switch button having a first side and connected to said first rod and a second side connected to said second rod; and wherein when said first side of said switch button is depressed, said first rod moves and said first and second pins move into the openings of, respectively, said first pair of operating buttons, thereby locking out said first pair of operating buttons, and when said second side of said switch button is depressed, said first rod moves and said first and second pins move out of the openings of, respectively, said first pair of operating buttons and said second rod moves and said third and fourth pins move into the openings of said second pair of operating buttons, thereby locking out said second pair of operating buttons;

further wherein said scroll wheel comprises at least one opening, further comprising a fifth pin coupled to said first rod, wherein when said first side of said switch button is depressed, said first rod moves and said fifth pin moves into said opening of said scroll wheel, thereby locking out said scroll wheel, and when said second side of said switch button is depressed, said first rod moves and said fifth pin moves out of said opening of said scroll wheel.

\* \* \* \* \*

UNITED STATES PATENT AND TRADEMARK OFFICE
CERTIFICATE OF CORRECTION

PATENT NO. : 6,348,912 B1
DATED : February 19, 2002
INVENTOR(S) : Smith

It is certified that error appears in the above-identified patent and that said Letters Patent is hereby corrected as shown below:

<u>Column 1,</u>
Line 16, "size" should be -- sized --;

Signed and Sealed this

Thirteenth Day of May, 2003

JAMES E. ROGAN
*Director of the United States Patent and Trademark Office*